US010540020B2

(12) United States Patent
Cook et al.

(10) Patent No.: US 10,540,020 B2
(45) Date of Patent: Jan. 21, 2020

(54) MAPPED VARIABLE SMOOTHING EVOLUTION METHOD AND DEVICE (71) Applicant: IDHL Holdings, Inc., Wilmington, DE (US)

(72) Inventors: Bryan A. Cook, Silver Spring, MD (US); Yun Li, Clarksburg, MD (US)

(73) Assignee: IDHL Holdings, Inc., Wilmington, DE (US)

( * ) Notice: Subject to any disclaimer, the term of this patent is extended or adjusted under 35 U.S.C. 154(b) by 0 days.

(21) Appl. No.: 16/138,393

(22) Filed: Sep. 21, 2018

(65) Prior Publication Data

US 2019/0025941 A1 Jan. 24, 2019

Related U.S. Application Data

(63) Continuation of application No. 14/888,255, filed as application No. PCT/US2014/036142 on Apr. 30, 2014, now Pat. No. 10,120,461.

(60) Provisional application No. 61/818,116, filed on May 1, 2013.

(51) Int. Cl.
*G09G 5/00* (2006.01)
*G06F 3/0346* (2013.01)
*G06F 3/038* (2013.01)

(52) U.S. Cl.
CPC ............ *G06F 3/0346* (2013.01); *G06F 3/038* (2013.01)

(58) Field of Classification Search
CPC ...... G06F 3/033; G06F 3/0346; G06F 3/0383; G06F 3/04812; G06F 3/1423; G06F 3/1454; G06F 3/017; G06F 3/014; G06F 3/04815
USPC .................................. 345/156–158; 702/151
See application file for complete search history.

(56) References Cited

U.S. PATENT DOCUMENTS

| 7,158,118 | B2 | 1/2007 | Liberty | |
|---|---|---|---|---|
| 7,683,883 | B2 | 3/2010 | Touma et al. | |
| 8,401,788 | B2 | 3/2013 | Kondoh | |
| 10,120,461 | B2 * | 11/2018 | Cook | G06F 3/0346 |
| 2007/0299626 | A1 * | 12/2007 | Song | G01C 21/16 |
| | | | | 702/151 |
| 2012/0075183 | A1 * | 3/2012 | Liberty | G06F 3/0346 |
| | | | | 345/158 |
| 2015/0185002 | A1 * | 7/2015 | Yang | G01B 21/22 |
| | | | | 702/151 |
| 2016/0098095 | A1 * | 4/2016 | Gonzalez-Banos | G06F 3/017 |
| | | | | 345/156 |

FOREIGN PATENT DOCUMENTS

WO    WO-2012044964 A2 *  4/2012  ............... G01B 7/00

\* cited by examiner

*Primary Examiner* — Jennifer T Nguyen
(74) *Attorney, Agent, or Firm* — Julian F. Santos (57) ABSTRACT

A variable mapped on an orientation of a device is smoothed to have a gradual evolution by adjusting the estimated orientation of the device obtained via sensor fusion or other sensor processing to take into consideration a current measured angular velocity.

20 Claims, 7 Drawing Sheets

MAPPED VARIABLE SMOOTHING EVOLUTION METHOD AND DEVICE

CROSS REFERENCE TO RELATED APPLICATIONS

This application is a Continuation of U.S. patent application Ser. No. 14/888,255, filed Oct. 30, 2018, which is a National Stage of International Application No. PCT/US14/36142, filed Apr. 30, 2014, which claims the benefit of U.S. Provisional Application No. 61/818,116, filed May 1, 2013; the contents of each of which are incorporated by reference herein.

TECHNICAL FIELD

The present inventions generally relate to methods and dedicated apparatuses outputting a variable mapped on a device orientation in a non-inertial reference system, with the device orientation being estimated using measurements of motion sensors (such as 3D accelerometers and gyroscopes) and a magnetometer or other similar sensors including cameras.

BACKGROUND

As described in WO 2012/044964, yaw, roll and pitch angles of a device in a gravitational reference system may be evaluated using measurements of a magnetometer and other motion sensors (accelerometers, gyroscopes) attached to the device. These methods include:
  determining a measured 3D magnetic field, a roll, a pitch and a raw estimate of yaw in the body reference system based on the received measurements,
  extracting a local 3D magnetic field from the measured 3D magnetic field, and
  calculating yaw angle of the body reference system in the gravitational reference system based on the extracted local 3D magnetic, the roll, the pitch and the raw estimate of yaw using at least two different methods,
wherein estimated errors of the roll, the pitch, and the extracted local 3D magnetic field affect an error of the yaw differently for the different methods.

A rotation matrix corresponding to the yaw, roll and pitch angles may be expressed as a quaternion (conversion between a rotation matrix corresponding to rotations around three orthogonal axes and a quaternion is known). The result of the sensor fusion methods described in WO 2012/044964 may be expressed as a quaternion.

Motion sensors may include gyroscopes or other sensors configured to measure angular velocities. The quaternion result from sensor fusion method (referred to as "fusion quaternion" hereinafter) is the best estimation of rotation angles (yaw, roll and pitch) based on all available sensor data. The sensor orientation (i.e., the output quaternion) may be mapped on a variable such as a position of a cursor on a screen or an image displayed to a user of a gaming system. Therefore, the output quaternion should be as accurate, stable (e.g., varying smoothly rather than "jumpy") and consistent with all sensor indications as achievable. However, at certain moments, the angle estimations (which may be expressed as the fusion quaternion) do not agree with direct angular velocity measurements and, therefore, are not suitable for direct and indiscriminate use.

When a conflict between the fusion quaternion and the measured angular velocity arises, simple approaches to overcome this conflict are (1) to use the fusion quaternion directly or (2) to use measured angular velocity only.

One problem with the first approach (using the fusion quaternion directly) is that the fusion quaternion is not always continuous due to many reasons, such as magnetic field interference, linear acceleration, accelerometer saturation, etc. Another problem is that a fusion quaternion may keep moving while the device is still, due to delays introduced in the fusion process. Moreover, the fusion quaternion may also move in a direction different from that indicated by the angular velocity, due to delay or adjustment.

The second approach (using only angular velocity) is also problematic. The integration drift over a long period of time may cause a large misalignment between the integrated angular position and the device's true orientation.

Accordingly, it would be desirable to provide apparatuses and methods that advantageously make use of the fusion quaternion while also maintaining compatibility with measured angular velocity and avoid the problems identified above relative to the first and second approaches.

SUMMARY

Method and apparatuses according to various embodiments perform fusion quaternion smoothing in view of a measured angular velocity, and output a smoothed version of the fusion quaternion. The smoothed quaternion always moves in a manner that largely agrees with the measured angular velocity, while also matching the fusion quaternion in the long run. This quaternion smoothing has the advantage that the smoothed quaternion is consistent with the angular velocity within an angle limit and a scale limit, so that any discrepancy or inconsistency is not noticed by users viewing a cursor or an image determined using the smoothed quaternion. Also, the smoothed quaternion follows the fusion quaternion in the long run, eliminating long-term misalignment.

According to an embodiment, there is a method for smoothing evolution of a variable depending on an orientation of a device. The method includes determining an adjusted angular velocity based on a measured angular velocity and an estimated angular velocity so as to satisfy one or more predefined constraints. The method further includes determining a current value of the variable according to an adjusted estimate of the device's current orientation, obtained using the adjusted angular velocity.

According to another embodiment, there is a method for smoothing evolution of a variable depending on an orientation of a device. The method includes determining an expected orientation using a previous orientation of the device and a measured angular velocity. The method further includes determining a current value of the variable according to an adjusted estimate of the device's current orientation, obtained so as to be as close as possible to an estimate of the device's current orientation, but with an angle between the adjusted estimate of the current orientation and the expected orientation to be less than a maximum angle.

According to another embodiment, there is a gaming system configured to display an image to a user according to an orientation of a device. The gaming system includes (i) sensors mounted on the device and configured to acquire information leading to a measured angular velocity and an estimate of a current orientation of the device, and (ii) a data processing unit. The data processing unit is configured to determine (A) an adjusted angular velocity based on the measured angular velocity and the estimated angular velocity so as to satisfy one or more predefined constraints, (B) an adjusted estimate of the device's current orientation, obtained using the adjusted angular velocity, and (C) the image to be displayed to the user according to the adjusted estimate of the current orientation.

According to yet another embodiment, there is an information system controlled by orientation of a device. The system includes sensors mounted on the device and configured to acquire information leading to a measured angular velocity and an estimate of a current orientation of the device, and a data processing unit. The data processing unit is configured to determine (A) an adjusted angular velocity based on the measured angular velocity and the estimated angular velocity so as to satisfy one or more predefined constraints, (B) an adjusted estimate of the device's current orientation, obtained using the adjusted angular velocity, and (C) a position of a cursor on a screen based on the device's current orientation.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. The following embodiments are discussed, for simplicity, with regard to the terminology and structure of systems using sensor fusion in which a magnetometer and motion sensors are used to evaluate orientation of a device.

Reference throughout the specification to "one embodiment" or "an embodiment" means that a particular feature, structure or characteristic described in connection with an embodiment is included in at least one embodiment of the present invention. Thus, the phrases "in one embodiment" or "in an embodiment" in various places throughout the specification are not necessarily all referring to the same embodiment. Further, the particular features, structures or characteristics may be combined in any suitable manner in one or more embodiments.

Figure 1:
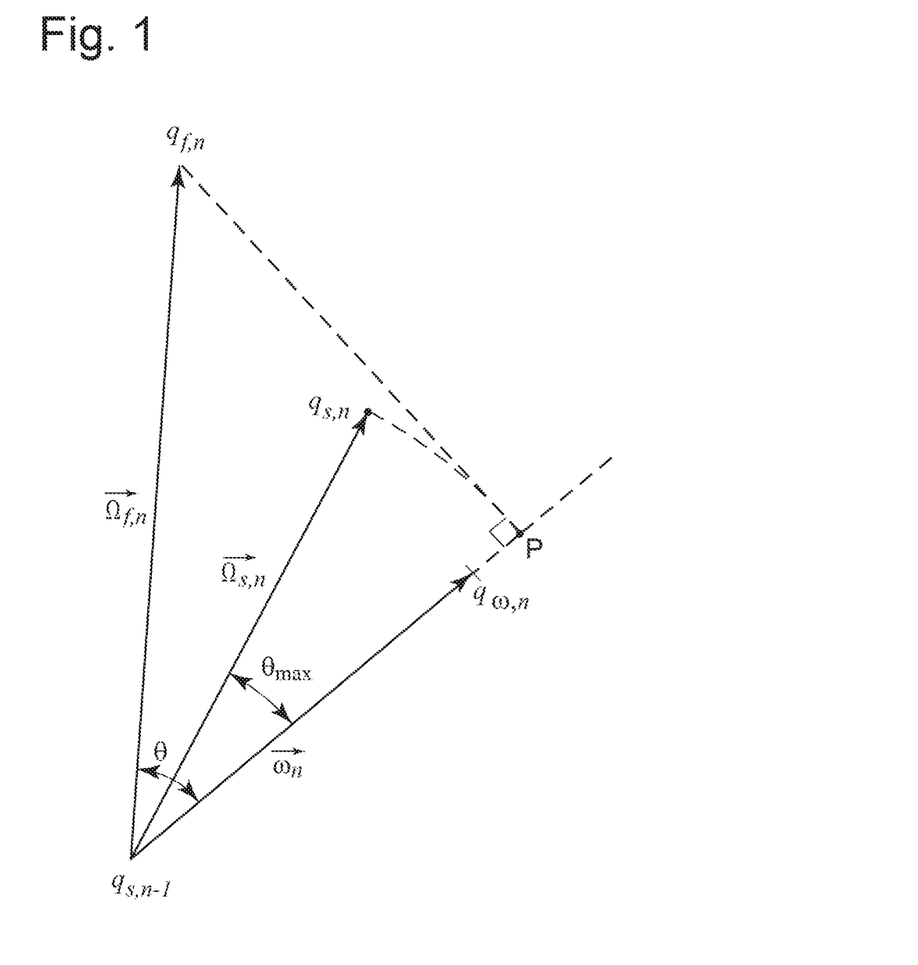
FIG. 1 is an illustration of the problem solved by quaternion smoothing.

FIG. 1 illustrates, as a starting point, the tip of a previous smoothed quaternion $q_{s,n-1}$ (here s stands for smoothed and n-1 indicates a previous moment). Sensor fusion method yields fusion quaternion $q_{f,n}$ (here f stands for fusion and n indicates the current moment, after n-1), but the measured angular velocity $\omega_n$ (considering the time interval n-1 to n unitary here and hereinafter when referring to angular velocity) indicates instead an expected quaternion $q_{\omega,n}$ (here $\omega$ indicates that measured angular velocity was used to infer this quaternion and n for the current moment). Methods according to various embodiments described in this section determine a current smoothed quaternion $q_{s,n}$ (here s stands for smoothed and again n indicates the current moment) located between quaternions $q_{f,n}$ and $q_{\omega,n}$. In various applications, a variable x (not shown) is mapped on the current smoothed quaternion $q_{s,n}$. For example, variable x may be a cursor position on the screen. The evolution of variable x is smoothed (i.e., sudden changes are implemented gradually) by using smoothed quaternion $q_{s,n}$.

Figure 2:
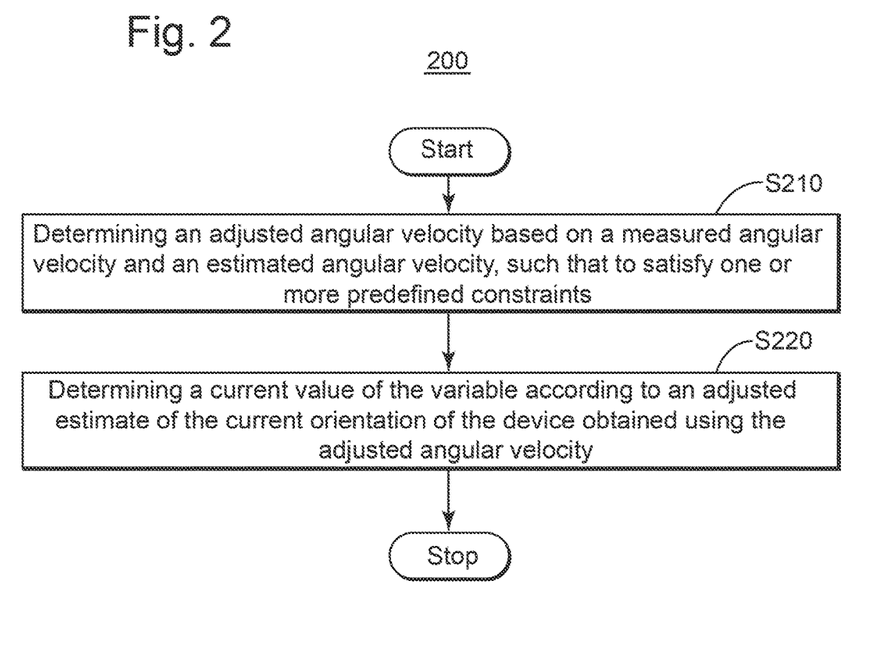
FIG. 2 is a flowchart of the quaternion smoothing method according to an embodiment.

FIG. 2 is a flowchart illustrating a method 200 for smoothing evolution of a variable depending on an orientation of a device. Method 200 includes, at S210, determining an adjusted angular velocity (e.g., $\Omega_{s,n}$, in FIG. 1) based on a measured angular velocity ($\omega_n$) and an estimated angular velocity ($\Omega_{f,n}$), so that the adjusted angular velocity satisfies one or more predefined constraints. Method 200 further includes, at S220, determining a current value (x) of the variable according to an adjusted (smoothed) estimate of the current orientation ($q_{s,n}$) of the device obtained using adjusted angular velocity ($\Omega_{s,n}$). Details of these steps according to various embodiments are described below.

Figure 3:
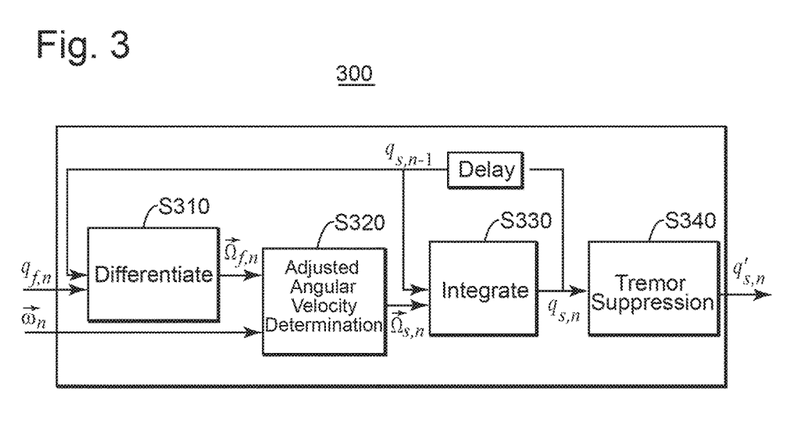
FIG. 3 is a block diagram of an angular velocity alignment method according to an embodiment.

FIG. 3 is a block diagram of a quaternion smoothing method 300 according to an embodiment. First, in block 310, estimated angular velocity $\Omega_{f,n}$ is determined based on the fusion quaternion $q_{f,n}$ (obtained based on magnetometer and motion sensor measurements using one of the methods described in WO 2012/044964) and the previous smoothed quaternion $q_{s,n-1}$. This estimated angular velocity $\Omega_{f,n}$ is, in general, different from the current angular velocity $\omega_n$ measured, for example, by a gyroscope.

In block 320, the adjusted angular velocity $\Omega_{s,n}$ leading (when integrated) to the smoothed quaternion $q_{s,n}$ is determined as follows. The direction of adjusted angular velocity $\Omega_{s,n}$ is set to match that of the estimated angular velocity $\Omega_{f,n}$, if the angle between estimated angular velocity $\Omega_{f,n}$ and current (measured) angular velocity $\omega_n$ is less than a predetermined angle limit $\theta_{max}$. The direction of adjusted angular velocity $\Omega_{s,n}$ is set at $\theta_{max}$ from the current (measured) angular velocity $\omega_n$, if the angle between estimated angular velocity $\Omega_{f,n}$ and current (measured) angular velocity $\omega_n$ exceeds the predetermined angle limit $\theta_{max}$. The adjusted angular velocity $\Omega_{s,n}$ is in the same plane as estimated angular velocity $\Omega_{f,n}$ and current (measured) angular velocity $\omega_n$.

Further, the magnitude of estimated angular velocity $\Omega_{s,n}$ is set equal to the magnitude of $\Omega_{f,n}$'s component along the angular velocity's direction, if the ratio between the magnitude of $\Omega_{f,n}$'s component and the angular velocity $\omega_n$ is within a predetermined scale range, and the magnitude is set to a minimum/maximum value (depending upon which limit of the range is exceeded) otherwise.

Then, in block 330, adjusted angular velocity $\Omega_{s,n}$ is integrated from the previous smoothed quaternion $q_{s,n-1}$ to obtain the current smoothed quaternion $q_{s,n}$. Due to the manner in which it is obtained, smoothed quaternion $q_{s,n}$ is always closer to the current fusion quaternion $q_{f,n}$ than quaternion $q_{\omega,n-1}$ indicated by measured angular velocity $\omega_n$.

A few special situations require particular treatment. A first special situation is when the difference between angular velocity $\omega_n$ and estimated angular velocity $\Omega_{f,n}$ exceeds a predetermined threshold. In one embodiment, fusion quaternion $q_{f,n}$ is output in the first special situation. However, other embodiments proceed differently in this first special situation.

Figure 4:
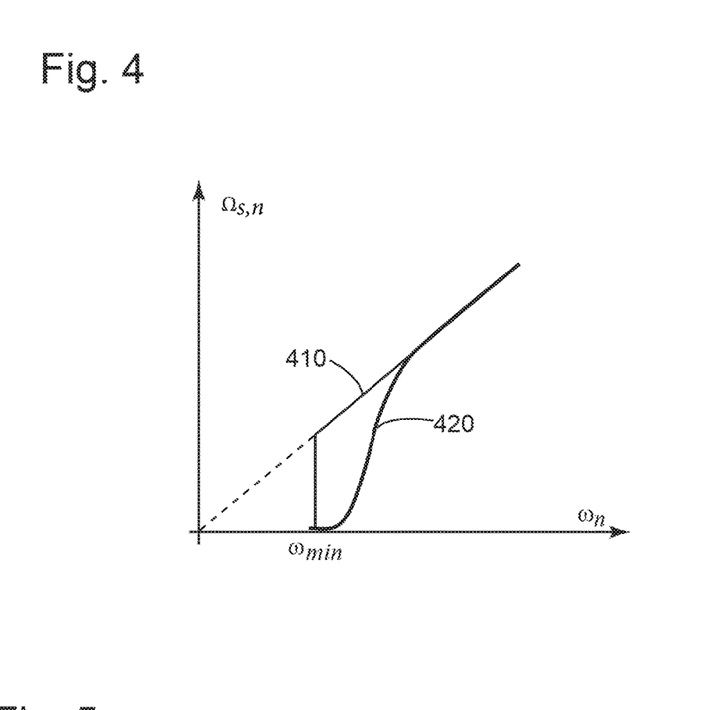
FIG. 4 is a graph of smoothed angular velocity versus measured angular velocity according to two embodiments.

A second special situation is when the magnitude of angular velocity $\omega_n$ is less than a minimum velocity $\omega_{min}$ (e.g., the user may intend to hold the device still). In one embodiment, the output quaternion $q_{s,n}$ is made equal to the previous smoothed quaternion $q_{s,n-1}$, i.e., the smoothed quaternion angular velocity $\Omega_{s,n}$ is zero. When angular velocity $\omega_n$ exceeds the pre-determined minimum $\omega_{min}$, the smoothed angular velocity $\Omega_{s,n}$ increases suddenly as illustrated by line 410 in FIG. 4. In one embodiment, this step increase may be smoothed to a more gradual increase as illustrated by curve 420. However, other embodiments may proceed differently in this second situation.

Returning now to FIG. 3, tremor suppression (alias smoothed quaternion stabilization) block 340 is optional. The purpose of tremor suppression is to output a stationary quaternion $q'_{s,n}$ when the current smoothed quaternion $q_{s,n}$ is very close to the previous smoothed quaternion $q_{s,n-1}$ (i.e., the smoothed quaternion is approximately stationary). Such a situation (i.e., second special situation discussed above) occurs, for example, when a user intends to keep the device stationary, but small motions due to hand tremor are sensed. Stabilization is not necessary when the sensor readings are filtered to remove noise and user's tremor. However, in case of severe user's tremor or when sensor readings are not filtered, tremor suppression is beneficial especially when the output quaternion is used to determine a cursor position (i.e., the variable is the cursor's position).

Figure 5:
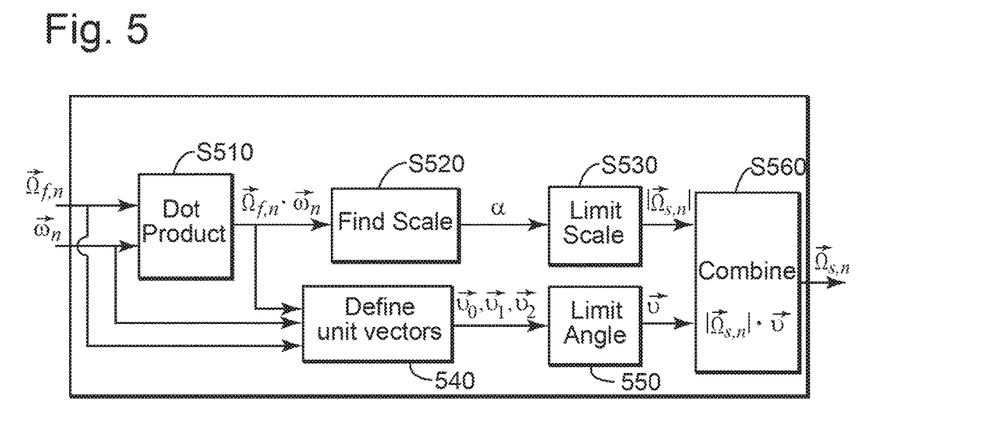
FIG. 5 is a block diagram for determining an adjusted angular velocity according to an embodiment.
Figure 6:
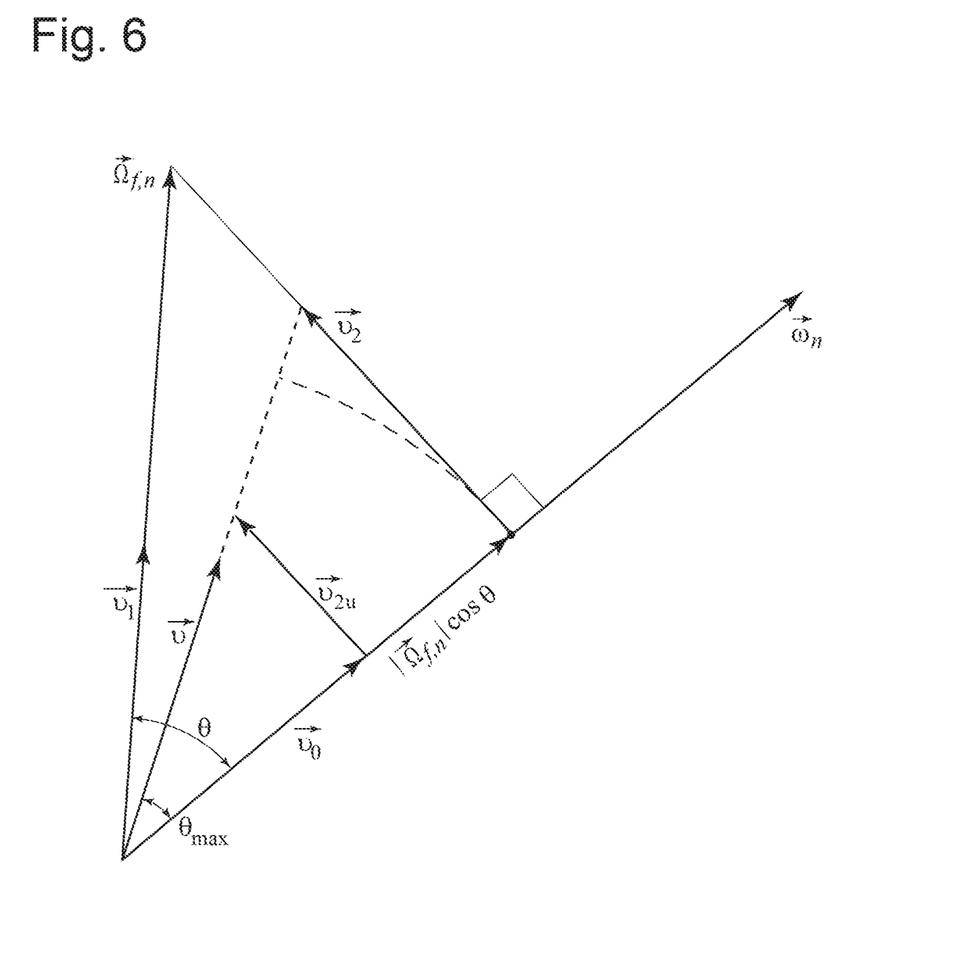
FIG. 6 illustrates determining the direction of the adjusted angular velocity according to an embodiment.

An embodiment of block 330 for determining adjusted angular velocity $\Omega_{s,n}$ (e.g., step S210 in FIG. 2) is illustrated FIG. 5, and further explained in FIG. 6. Determining adjusted angular velocity $\Omega_{s,n}$ starts from measured angular velocity $\omega_n$ and estimated angular velocity $\Omega_{f,n}$ (i.e., these are the block's inputs). This processing encompasses two aspects: determining the magnitude and the orientation of adjusted angular velocity. These determinations are subject to two constraints: (A) the difference between the magnitude of the adjusted angular velocity and the measured angular velocity to be limited (i.e., the magnitude is within a predetermined range relative to measured angular velocity's magnitude), and (B) an angle between the estimated angular velocity $\Omega_{f,n}$ and the measured angular velocity $\omega_n$ to be limited.

Block 510 calculates the scalar product of estimated angular velocity $\Omega_{f,n}$ and measured angular velocity $\omega_n$. The scalar product may be used to determine the cosine of angle $\theta$ between estimated angular velocity and measured angular velocity:

$$\cos\theta = \frac{\omega_n \cdot \Omega_{f,n}}{|\omega_n||\Omega_{f,n}|}, \tag{1}$$

where $\|$ indicates magnitude • indicates scalar product.

Block 520 then calculates an initial scale $\alpha$ according to the formula (2):

$$\alpha = \frac{|\Omega_{f,n}|\cos\theta}{|\omega_n|}. \tag{2}$$

The numerator of this ratio is the magnitude of the estimated angular velocity's projection along the measured angular velocity (i.e., from $q_{s,n-1}$ to point P in FIG. 1). Projecting estimated angular velocity $\Omega_{f,n}$ is represented in FIG. 1 using a dashed line, which starts at the tip of estimated angular velocity $\Omega_{f,n}$, is perpendicular to the measured angular velocity $\omega_n$, and ends in point P. The initial scale $\alpha$ may then be adjusted in block 530 to a scale value $\alpha'$ within the range (MinScaling, MaxScaling):

$$\alpha' = \begin{cases} \text{MaxScaling} & \text{If } \alpha > \text{MaxScaling} \\ \text{MinScaling} & \text{If } \alpha < \text{MinScaling} \\ \alpha & \text{for all other } \alpha \end{cases} \tag{3}$$

The magnitude of adjusted angular velocity $\Omega_{s,n}$ is then:

$$|\Omega_{s,n}| = \alpha'|\omega_n|. \tag{4}$$

FIG. 1 illustrates the situation in which $\alpha=\alpha'$ and, therefore, the locus of the adjusted angular velocity's tip is the dashed portion of a circle with the center in $q_{s,n-1}$ and passing through point P.

To determine the direction of the adjusted angular velocity, in block 540, a set of unit vectors is defined as illustrated in FIG. 6. Unit vector $v_0$ is along the measured angular velocity $\omega_n$. Unit vector $v_1$ is along the estimated angular velocity $\Omega_{f,n}$. In other words, measured angular velocity $\omega_n$ and estimated angular velocity $\Omega_{f,n}$ may be written as:

$$\omega_n = v_0|\omega_n| \tag{5}$$

$$\Omega_{f,n} = v_1|\Omega_{f,n}|. \tag{6}$$

Unit vector $v_2$ is the normalized component of vector $v_1$ on a direction perpendicular to vector $v_0$. Before normalization, vector $v_1$'s component on the direction perpendicular to vector $v_0$ is $v_2^u$, and it is equal to the difference between the vector $v_1$ and vector $v_0$'s projection along $v_1$ (i.e., $v_1 \cos\theta$):

$$v_2^u = v_1 - v_0 \cos\theta \tag{7}$$

$$v_2 = \frac{v_2^u}{|v_2^u|}. \tag{8}$$

The direction of the adjusted angular velocity $\Omega_{s,n}$ is unit vector $v$ defined using $v_0$, $v_2$ and a predefined parameter $\theta_{max}$ to be $$v = v_2 \sin\theta_{max} + v_0 \cos\theta_{max}. \tag{9}$$

Thus, unit vector $v$ is coplanar to unit vectors $v_0$, $v_1$, at $\theta_{max}$ from unit vector $v_0$ toward unit vectors $v_1$. Other alternative methods may be used to obtain unit vector $v$.

In one embodiment, at block 550, if angle $\theta$ between estimated angular velocity $\Omega_{f,n}$ and measured angular velocity $\omega_n$ is less than $\theta_{max}$ then $v=v_1$. Otherwise (if angle $\theta$ exceeds $\theta_{max}$) $v$ is calculated with formula (9).

At block 560, outputs of blocks 530 and 550 (i.e., magnitude and orientation) are combined to obtain adjusted angular velocity $\Omega_{s,n}$ as:

$$\Omega_{s,n} = |\Omega_{s,n}| \cdot v. \tag{10}$$

The above-discussed methods for determining adjusted angular velocity can also be used when smoothed angular position is not represented by quaternions, but by Euler angles or rotation matrices.

The amount of quaternion difference between smoothed quaternion $q_{s,n}$ and fusion quaternion $q_{f,n}$ is influenced by parameters $\theta_{max}$, MinScaling and MaxScaling. In some embodiments, these parameters may be fixed, but in other embodiments these parameters may be dynamically adjusted to obtain a smoother result. For example, the adjustment may be made larger when the difference between estimated angular velocity and measured angular velocity is large.

Under some circumstances (e.g., dramatic changes of the fusion quaternion q), the adjustment might be in one direction for a first moment, and change to the opposite direction for a second (next) moment. To reduce radical and frequent changes, in one embodiment, the variation of the quaternion adjustment from one moment to the next may be limited.

Figure 7:
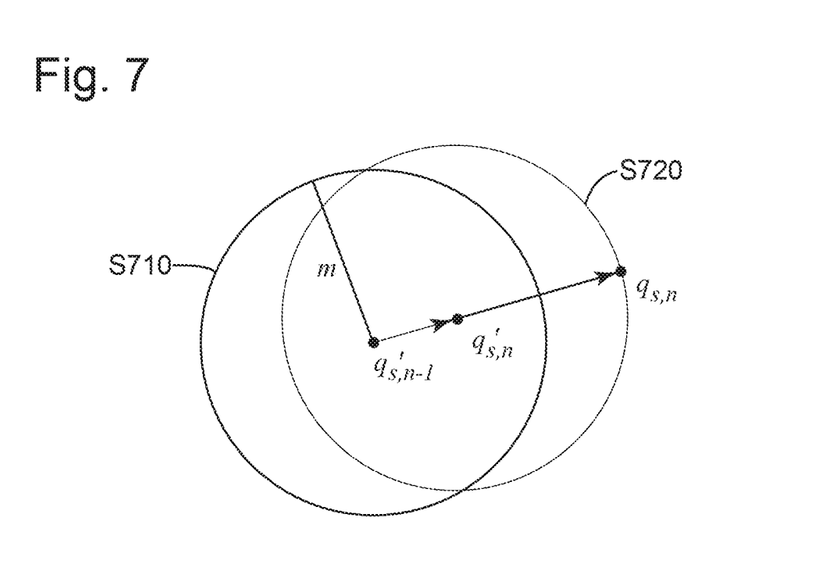
FIG. 7 illustrates tremor suppression according to an embodiment.

Returning now to FIG. 3, in one embodiment, optional tremor suppression block 340 operates based on a circular backlash algorithm. Although the quaternion is a 4D variable, the concept of circular backlash is illustrated in FIG. 7 as a 2D drawing. Circle 710 has as its center the previous stabilized quaternion $q'_{s,n-1}$ and a radius m (i.e., a maximum angular velocity multiplied by an unitary time interval from n−1 to n). If the current adjusted quaternion $q_{s,n}$ is inside circle 710, then the stabilized quaternion $q'_{s,n}$ is made equal to the previous stabilized quaternion $q'_{s,n-1}$ (i.e., $q'_{s,n}=q'_{s,n-1}$) so that the stabilized quaternion $q'_{s,n}$ and the circle surrounding it remain the same. If the current adjusted quaternion $q_{s,n}$ is outside circle 710, a new circle 720 is shifted relative to circle 710 with the least amount necessary to cover $q_{s,n}$. Stabilized quaternion $q'_{s,n}$ is the center of this new circle 720.

Thus, if $q_{s,n}-q'_{s,n-1}<m$ (i.e., $q_{s,n}$ is inside the circle), $q'_{s,n}-q'_{s,n-1}=0$, otherwise $q'_{s,n}-q'_{s,n-1}=q_{s,n}-q'_{s,n-1}-m$ (i.e., the output quaternion $q'_{s,n}$ and the circle are shifted with the least amount necessary to cover $q_{s,n}$).

Figure 8:
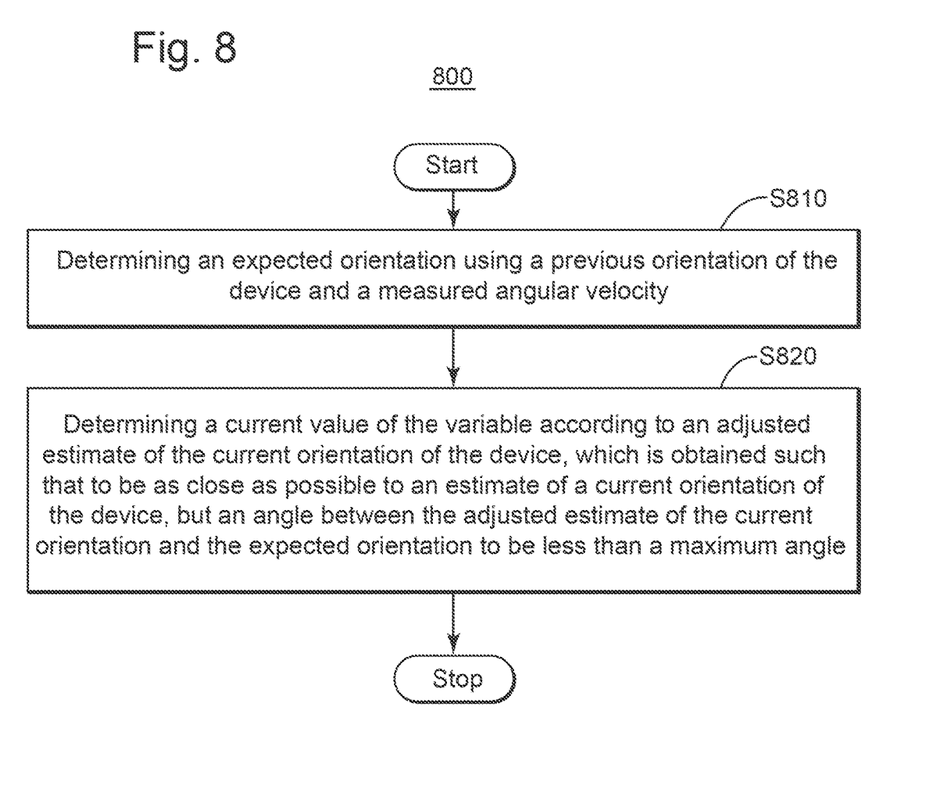
FIG. 8 is a flowchart of a method according to another embodiment.

The current smoothed quaternion $q_{s,n}$ may be obtained in the quaternion domain directly, without using angular velocities (i.e., skipping blocks 310 and 330 in FIG. 3). FIG. 8 is a flowchart of a method 800 according to an embodiment, in which an expected orientation $q_{\omega,n}$ is determined using measured angular velocity $\omega_n$ and a previous orientation $q_{s,n-1}$, at S810. Then, at S820, method 800 includes determining a current value x of the variable according to an adjusted estimate of the current orientation $q_{s,n}$ of the device which is obtained so as to minimize the angle between it and the estimate of a current orientation $q_{f,n}$ of the device (e.g., according to the sensor fusion), while satisfying the requirement that the angle $\varphi$ between the adjusted estimate of current orientation $q_{s,n}$ and expected orientation $q_{\omega,n}$ be less than a maximum angle $\varphi_{max}$. For example, if the angular difference $\varphi$ between $q_{f,n}$ and $q_{\omega,n}$ is less than $\varphi_{max}$, then $q_{s,n}=q_{f,n}$, and otherwise, $q_{s,n}$ may be interpolated as a weighted average between $q_{f,n}$ (e.g., weighted by $\varphi_{max}/\varphi$) and $q_{\omega,n}$ (e.g., weighted by $1-\varphi_{max}/\varphi$). The accurate interpolation for quaternion is a spherical linear interpolation, but the following linear approximation may be used instead:

$$q_{s,n}=q_{f,n}w_f+q_{\omega,n}(1-w_f) \tag{11}$$

where $w_f=\min(1,\varphi_{max}/\varphi)$.

The angle difference limit $\varphi_{max}$ may be a monotonic function of the measured angular velocity's magnitude $|\omega_n|$.

Figure 9:
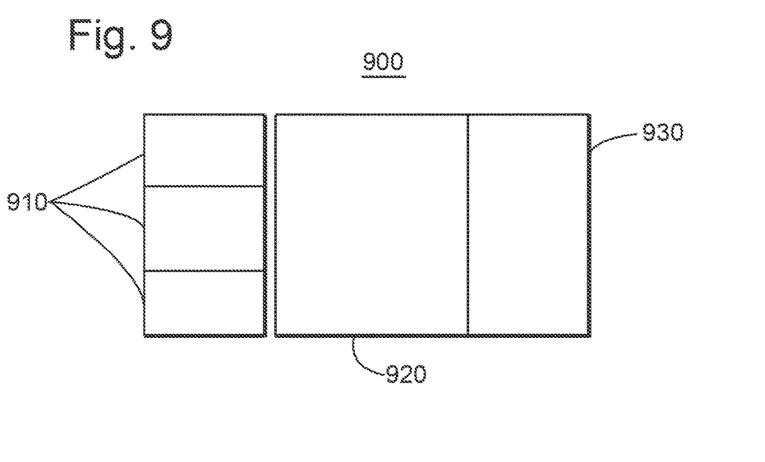
FIG. 9 is a block diagram of an apparatus according to an embodiment.

A dedicated apparatus/system may be used to implement the above-described methods. This dedicated apparatus/system may be part of a gaming system or an information system controlled by orientation of a device. For example, FIG. 9 illustrates a block diagram of such a system 900. System 900 includes sensors 910 (e.g., an accelerometer, a gyroscope and a magnetometer) mounted on the device and configured to acquire information leading to a measured angular velocity $\omega_n$ and an estimate of a current orientation $q_{f,n}$ of the device. System 900 further includes data processing unit 920 configured to determine (A) an adjusted angular velocity $\Omega_{s,n}$ based on measured angular velocity $\omega_n$ and estimated angular velocity $\Omega_{f,n}$ to satisfy one or more predefined constraints, and (B) an adjusted estimate of current orientation $q_{s,n}$ of the device obtained using adjusted angular velocity $\Omega_{s,n}$. The adjusted estimate of current orientation is mapped on variable x that may be used by a hardware component distinct from the device. Data processing unit 920 may be located on the device or remote, for example, on the hardware component (e.g., a display) using the variable x.

If system 900 is a gaming system configured to display an image to a user according to an orientation of a device (e.g., a handheld device), then data processing unit 920 is further configured to determine the image to be displayed according to the adjusted estimate of current orientation $q_{s,n}$.

If system 900 is an information system controlled by orientation of a device, then data processing unit 920 is further configured to determine the position of a cursor on a screen based on the current orientation $q_{s,n}$ of the device.

System 900 may also include a memory 930 storing a computer program product which, when executed by a data processing unit, executes any of the above-described methods. The memory may be any suitable computer-readable medium, including hard disks, CD-ROMs, digital versatile disc (DVD), optical storage devices, or magnetic storage devices such as a floppy disk or magnetic tape. Other non-limiting examples of computer-readable media include flash-type memories or other known memories. Accordingly, the exemplary embodiments may take the form of an entirely hardware embodiment or an embodiment combining hardware and software aspects.

The disclosed exemplary embodiments provide methods and apparatuses for determining an adjusted and (optionally) stabilized orientation of a device in a non-inertial reference system using measurements of motion sensors (such as 3D accelerometers and gyroscopes) and a magnetometer. It should be understood that this description is not intended to limit the invention. On the contrary, the exemplary embodiments are intended to cover alternatives, modifications and equivalents, which are included in the spirit and scope of the invention. Other sensors could be used to measure orientations including angular position sensors, tilt sensors, cameras and so on. The various embodiments can be used when those alternate sensors are used. Further, in the detailed description of the exemplary embodiments, numerous specific details are set forth in order to provide a comprehensive understanding of the inventions. However, one skilled in the art would understand that various embodiments may be practiced without such specific details. Orientation and angular velocity are exemplary features here, but similar methods to smooth a variable in a way that minimizes distress to either humans or other equipment or algorithms downstream. For example, similar methods could apply to translational movement's position and velocity. The variable does not have to be angular position or velocity nor does the targeted consumer have to be a human being.

Although the features and elements of the present exemplary embodiments are described in the embodiments in particular combinations, each feature or element can be used alone without the other features and elements of the embodiments or in various combinations with or without other features and elements disclosed herein.

What is claimed is:

1. A method for smoothing evolution of a variable based on an orientation of a device, the method comprising:
   determining an adjusted estimate of the current orientation of the device using an adjusted angular velocity, wherein the adjusted angular velocity is based on a measured angular velocity and an estimated angular velocity;
   on condition that the adjusted estimate of the current orientation falls outside a boundary circumscribing a previous stabilized orientation of the device, setting a current value of the variable according to a current stabilized orientation of the device, wherein the current stabilized orientation of the device is equal to the adjusted estimate of the current orientation of the device and offset from the previous stabilized orientation of the device by an amount sufficient to shift the adjusted estimate of the current orientation to be within the boundary circumscribing a previous stabilized orientation of the device; and
   outputting the current value of the variable.

2. The method of claim 1, wherein the variable is a position of a cursor on a screen.

3. The method of claim 1, wherein the variable defines an image displayed to a video-game user.

4. The method of claim 1, further comprising:
   on condition that the adjusted estimate of the current orientation falls within the boundary circumscribing a previous stabilized orientation of the device, setting the current stabilized orientation of the device to the previous stabilized orientation.

5. The method of claim 1, wherein the amount sufficient to shift the adjusted estimate of the current orientation to be within the boundary circumscribing the stabilized previous orientation is a minimum amount necessary to shift the adjusted estimate of the current orientation to be within the boundary circumscribing the stabilized previous orientation.

6. The method of claim 1, wherein the boundary is defined by a circle having the previous stabilized orientation at its center and a radius m, wherein the radius m is based on an allowed angular velocity.

7. The method of claim 1, wherein the allowed angular velocity is a maximum angular velocity multiplied by a unitary time interval from n–1 to n.

8. A method for smoothing evolution of a variable depending on an orientation of a device, the method comprising:
   determining an adjusted estimate of the current orientation of the device using an adjusted angular velocity, wherein the adjusted angular velocity is based on a measured angular velocity and an estimated angular velocity;
   on condition that the adjusted estimate of the current orientation falls outside a boundary circumscribing a previous previous orientation, outputting a current stabilized orientation of the device, wherein the current stabilized orientation of the device is equal to the adjusted estimate of the current orientation and offset from the previous stabilized orientation of the device by an amount sufficient to shift the adjusted estimate of the current orientation to be within the boundary circumscribing the previous stabilized orientation.

9. The method of claim 8, further comprising:
   on condition that the adjusted estimate of the current orientation falls within the boundary circumscribing a previous stabilized orientation of the device, outputting the previous stabilized orientation as the current stabilized orientation of the device.

10. The method of claim 8, wherein the amount sufficient to shift the adjusted estimate of the current orientation to be within the boundary circumscribing the stabilized previous orientation is a minimum amount necessary to shift the adjusted estimate of the current orientation to be within the boundary circumscribing the stabilized previous orientation.

11. The method of claim 8, wherein the boundary is defined by a circle having the previous stabilized orientation at its center and a radius m, wherein the radius m is based on an allowed angular velocity.

12. The method of claim 8, wherein the allowed angular velocity is a maximum angular velocity multiplied by a unitary time interval from n-1 to n.

13. The method of claim 8, wherein a new boundary circumscribes the current stabilized orientation of the device, and wherein the new boundary is defined by a circle having the current stabilized orientation at its center and a radius m, wherein the radius m is based on an allowed angular velocity.

14. The method of claim 8, wherein a new boundary circumscribes the current stabilized orientation of the device, and wherein the new boundary is defined by a circle having the current stabilized orientation at its center and a radius m, wherein the radius m is based on an allowed angular velocity.

15. An apparatus supporting smoothing evolution of a variable based on an orientation of a device, wherein the apparatus comprises comprising circuitry, including a processor and memory, configured to:
   determine an adjusted estimate of the current orientation of the device using an adjusted angular velocity, wherein the adjusted angular velocity is based on a measured angular velocity and an estimated angular velocity;
   output a current stabilized orientation of the device on condition that the adjusted estimate of the current orientation falls outside a boundary circumscribing a stabilized previous orientation, wherein the current stabilized orientation of the device is equal to the adjusted estimate of the current orientation offset from the previous stabilized orientation of the device by an amount sufficient to shift the adjusted estimate of the current orientation to be within the boundary circumscribing the stabilized previous orientation.

16. The apparatus of claim 15, wherein the circuitry is configured to:
   output the previous stabilized orientation as the current stabilized orientation of the device on condition that the adjusted estimate of the current orientation falls within the boundary circumscribing a previous stabilized orientation of the device.

17. The apparatus of claim 15, wherein the amount sufficient to shift the adjusted estimate of the current orientation to be within the boundary circumscribing the stabilized previous orientation is a minimum amount necessary to shift the adjusted estimate of the current orientation to be within the boundary circumscribing the stabilized previous orientation.

18. The apparatus of claim 15, wherein the boundary is defined by a circle having the previous stabilized orientation at its center and a radius m, wherein the radius m is based on an allowed angular velocity.

19. The apparatus of claim 15, wherein the allowed angular velocity is a maximum angular velocity multiplied by a unitary time interval from n–1 to n.

20. The apparatus of claim 15, wherein a new boundary circumscribes the current stabilized orientation of the device, and wherein the new boundary is defined by a circle having the current stabilized orientation at its center and a radius m, wherein the radius m is based on an allowed angular velocity.

* * * * *

UNITED STATES PATENT AND TRADEMARK OFFICE
CERTIFICATE OF CORRECTION

| | |
|---|---|
| PATENT NO. | : 10,540,020 B2 |
| APPLICATION NO. | : 16/138393 |
| DATED | : January 21, 2020 |
| INVENTOR(S) | : Bryan Cook and Yun Li |

It is certified that error appears in the above-identified patent and that said Letters Patent is hereby corrected as shown below:

In the Claims

At Column 9, Line 56, Claim 8, delete "previous previous" and insert --previous--

At Column 10, Line 67, Claim 19, delete "n-1to n." and insert --n-1 to n.--

Signed and Sealed this
Twentieth Day of June, 2023

*Katherine Kelly Vidal*

Katherine Kelly Vidal
*Director of the United States Patent and Trademark Office*